US00RE47789E

(19) United States
(12) Reissued Patent
Ball et al.

(10) Patent Number: US RE47,789 E
(45) **Date of Reissued Patent: *Dec. 31, 2019**

(54) SANITARY HYDRANT

(71) Applicant: WCM Industries, Inc., Colorado Springs, CO (US)

(72) Inventors: William T. Ball, Colorado Springs, CO (US); Eric Pilarczyk, Colorado Springs, CO (US); Cody Jackson, Colorado Springs, CO (US)

(73) Assignee: WCM Industries, Inc., Colorado Springs, CO (US)

( * ) Notice: This patent is subject to a terminal disclaimer.

(21) Appl. No.: 15/958,901

(22) Filed: Apr. 20, 2018

Related U.S. Patent Documents

Reissue of:
(64) Patent No.: 9,593,471
Issued: Mar. 14, 2017
Appl. No.: 14/988,600
Filed: Jan. 5, 2016

U.S. Applications:
(63) Continuation of application No. 14/623,730, filed on Feb. 17, 2015, now Pat. No. 9,228,327, which is a continuation of application No. 13/933,264, filed on Jul. 2, 2013, now Pat. No. 8,955,538, which is a continuation of application No. 13/048,445, filed on Mar. 15, 2011, now Pat. No. 8,474,476.

(60) Provisional application No. 61/313,918, filed on Mar. 15, 2010, provisional application No. 61/313,902, filed on Mar. 15, 2010.

(51) Int. Cl.
*E03B 9/14* (2006.01)
*E03B 9/02* (2006.01)

(52) U.S. Cl.
CPC ..... *E03B 9/14* (2013.01); *E03B 9/027* (2013.01); *Y10T 137/0318* (2015.04); *Y10T 137/5327* (2015.04); *Y10T 137/5444* (2015.04); *Y10T 137/5497* (2015.04); *Y10T 137/87338* (2015.04)

(58) Field of Classification Search
CPC ..... E03B 9/14; E03B 9/027; Y10T 137/0318; Y10T 137/5327; Y10T 137/87338; Y10T 137/5497; Y10T 137/5444
See application file for complete search history.

(56) References Cited

U.S. PATENT DOCUMENTS

| | | | |
|---|---|---|---|
| 21,858 | A | 10/1858 | Swan |
| 53,944 | A | 4/1866 | Biggs et al. |
| 244,804 | A | 7/1881 | Gillespie |
| 556,500 | A | 3/1896 | Fox |
| 609,805 | A | 8/1898 | Hardy |
| 610,470 | A | 9/1898 | Buehler |
| 616,542 | A | 12/1898 | Koehne |
| 695,147 | A | 3/1902 | Denney |
| 695,311 | A | 3/1902 | Hickey |

(Continued)

OTHER PUBLICATIONS

U.S. Appl. No. 15/416,175, Notice of Allowance dated Jul. 13, 2018, 8 pages. (WMC-43-CON-4).

(Continued)

*Primary Examiner* — William C Doerrler

(57) ABSTRACT

A freeze resistant sanitary hydrant is provided that employs a reservoir for storage of fluid under the frost line or in an area not prone to freezing. To evacuate this reservoir, a means for altering pressure is provided that is able to function in hydrant systems that employ a vacuum breaker.

10 Claims, 19 Drawing Sheets

(56) References Cited

U.S. PATENT DOCUMENTS 926,185 A 9/1909 Hayes
934,188 A 9/1909 Kirby
962,294 A 6/1910 Armington
1,021,537 A 3/1912 Lawnin
1,069,003 A 7/1913 Haennig
1,310,521 A 7/1919 Crall
1,426,407 A 8/1922 Pennington
1,433,110 A 10/1922 Buckler
1,556,241 A 10/1925 Mueller
1,570,180 A 1/1926 Pulliam
1,621,905 A 3/1927 Russell
1,774,307 A 8/1930 Willig
1,828,763 A 10/1931 Carnes
1,936,669 A 11/1933 Heeter
1,937,667 A 12/1933 Parsley et al.
2,025,067 A 12/1935 Miller
2,072,427 A 3/1937 O'Brien
2,077,021 A 4/1937 Sites
2,097,733 A 11/1937 Miller
2,140,829 A 12/1938 Child
2,306,012 A 12/1942 Campbell
2,329,960 A 9/1943 Verheul
2,429,940 A 10/1947 McDaniel
2,484,063 A 10/1949 Ackley
2,498,395 A 2/1950 Coss
2,574,625 A 11/1951 Coss
2,580,199 A 12/1951 Schmid
2,583,956 A 1/1952 Lindsay et al.
2,598,488 A 5/1952 Bart
2,598,968 A * 6/1952 Boosey ..... E03B 9/14
137/282
2,599,325 A 6/1952 Fritzberg
2,605,781 A 8/1952 Schmid et al.
2,629,402 A 2/1953 Cook
2,652,224 A 9/1953 Noland
2,664,096 A 12/1953 Murdock et al.
2,675,825 A 4/1954 Hobbs et al.
2,688,976 A 9/1954 Baker
2,708,449 A 5/1955 Keithley
2,730,326 A 1/1956 Staben
2,893,418 A 7/1959 Leventhal
2,949,933 A 8/1960 Moen
2,986,341 A 5/1961 Goodrie
2,997,054 A 8/1961 Woodford
3,014,667 A 12/1961 McLean et al.
3,017,896 A 1/1962 Papacek
3,023,767 A 3/1962 Woodford
3,029,603 A 4/1962 Ackroyd
3,056,418 A 10/1962 Adams et al.
3,070,116 A 12/1962 Noland et al.
3,146,142 A 8/1964 Maly
3,150,383 A 9/1964 Reich
3,155,107 A 11/1964 Woodford
3,162,407 A 12/1964 Yax
3,244,192 A 4/1966 Noland
3,283,093 A 11/1966 Bishop
3,348,862 A 10/1967 Leopold, Jr. et al.
3,380,464 A 4/1968 Arterbury
3,384,113 A 5/1968 Pennisi
3,390,898 A 7/1968 Sumida
3,392,745 A 7/1968 Noland
3,407,837 A 10/1968 Fulton et al.
3,414,001 A 12/1968 Woodford
3,416,555 A 12/1968 Chapou
3,424,189 A 1/1969 Woodford
3,429,596 A 2/1969 Marshall
3,480,027 A 11/1969 Noland
3,543,786 A 12/1970 Woodford
3,566,905 A 3/1971 Noland
3,612,584 A 10/1971 Taylor
3,638,680 A 2/1972 Kopp
3,679,241 A 7/1972 Hoffmann
D227,365 S 6/1973 Woodford
D227,366 S 6/1973 Woodford
3,770,003 A 11/1973 Uroshevich
3,818,874 A 6/1974 Tria
3,885,585 A 5/1975 Carpentier
D236,892 S 9/1975 Carlson
3,905,382 A 9/1975 Waterston
3,913,602 A 10/1975 Yoon
3,926,206 A 12/1975 Anderson et al.
3,926,207 A 12/1975 Anderson et al.
3,952,770 A 4/1976 Botnick
3,983,896 A 10/1976 Harrington
4,008,732 A 2/1977 Fichter et al.
4,013,088 A 3/1977 Gocke et al.
D244,605 S 6/1977 Ratnik
4,034,174 A 7/1977 McCord
4,093,280 A 6/1978 Yoshizawa et al.
4,096,877 A 6/1978 Arledge, II
4,103,941 A 8/1978 Stoll
4,109,671 A 8/1978 Hughes et al.
4,112,966 A 9/1978 Carlson
4,117,856 A 10/1978 Carlson
4,134,424 A 1/1979 Zeyra et al.
4,158,366 A 6/1979 Van Meter
4,178,956 A 12/1979 Fillman
4,182,356 A 1/1980 Woodford, Sr.
4,209,033 A 6/1980 Hirsch et al.
4,212,319 A 7/1980 Krablin
4,266,813 A 5/1981 Oliver
4,281,857 A 8/1981 Randall
4,282,895 A 8/1981 Young
4,286,616 A 9/1981 Botnick
4,300,593 A 11/1981 Ritter
4,316,481 A 2/1982 Fillman
4,429,422 A 2/1984 Wareham
D275,512 S 9/1984 Shaw
4,475,570 A 10/1984 Pike et al.
4,483,361 A 11/1984 Jungbert, Sr.
4,503,877 A 3/1985 Ward et al.
4,577,653 A 3/1986 Marty
D284,302 S 6/1986 Hammarstedt
4,609,006 A 9/1986 Parkison et al.
4,619,287 A 10/1986 Hama et al.
4,649,959 A 3/1987 Wadleigh
4,653,521 A 3/1987 Fillman et al.
4,653,522 A 3/1987 Fillman et al.
4,655,486 A 4/1987 Tarnay et al.
4,700,732 A 10/1987 Francisco
4,703,956 A 11/1987 Keech
4,712,575 A 12/1987 Lair
4,712,812 A 12/1987 Weir, III
D297,971 S 10/1988 Kiyota et al.
4,776,362 A 10/1988 Domingue et al.
4,784,303 A 11/1988 Ahad et al.
4,790,573 A 12/1988 Cardozo
4,798,221 A 1/1989 Crawford et al.
4,821,762 A 4/1989 Breneman
4,821,763 A 4/1989 Ackroyd et al.
4,854,339 A 8/1989 Hoeptner, III
4,884,725 A 12/1989 Ahad et al.
4,909,270 A 3/1990 Enterante, Sr. et al.
4,937,559 A 6/1990 Meacham et al.
4,946,434 A 8/1990 Plaisted et al.
4,964,657 A 10/1990 Gonzales
4,976,279 A 12/1990 King, Sr. et al.
4,984,306 A 1/1991 Sumerix
5,024,419 A 6/1991 Mulvey
5,029,603 A 7/1991 Ackroyd
5,033,500 A 7/1991 Hoeptner, III
5,045,836 A 9/1991 Nobles, Jr.
5,050,632 A 9/1991 Means, Jr.
5,054,517 A 10/1991 Liesenhoff et al.
5,058,627 A 10/1991 Brannen
5,109,929 A 5/1992 Spears
5,129,416 A 7/1992 Ackroyd
5,135,028 A 8/1992 Rickenbach et al.
5,160,179 A 11/1992 Takagi
5,195,785 A 3/1993 Jellison
5,205,325 A 4/1993 Piper
5,217,040 A 6/1993 Hochstrasser
5,226,629 A 7/1993 Millman et al.
5,228,470 A 7/1993 Lair et al.

(56) References Cited

U.S. PATENT DOCUMENTS

| | | | |
|---|---|---|---|
| 5,241,981 | A | 9/1993 | Ahern |
| 5,246,028 | A | 9/1993 | Vandepas |
| 5,261,441 | A | 11/1993 | Anderson |
| 5,284,582 | A | 2/1994 | Yang |
| 5,366,257 | A | 11/1994 | McPherson et al. |
| 5,392,805 | A | 2/1995 | Chrysler |
| 5,394,572 | A | 3/1995 | Humphreys |
| 5,399,173 | A | 3/1995 | Parks et al. |
| 5,402,815 | A | 4/1995 | Hoch, Jr. et al. |
| 5,437,481 | A | 8/1995 | Spears et al. |
| 5,482,329 | A | 1/1996 | McCall et al. |
| 5,496,076 | A | 3/1996 | Lin |
| 5,551,473 | A | 9/1996 | Lin et al. |
| 5,555,907 | A | 9/1996 | Philipp |
| 5,590,679 | A | 1/1997 | Almasy et al. |
| 5,603,347 | A | 2/1997 | Eaton |
| 5,632,303 | A | 5/1997 | Almasy et al. |
| 5,649,723 | A | 7/1997 | Larsson |
| 5,653,254 | A | 8/1997 | Condon et al. |
| 5,690,141 | A | 11/1997 | Creaghe |
| 5,701,925 | A | 12/1997 | Mulligan et al. |
| 5,740,831 | A | 4/1998 | DeNardo et al. |
| 5,752,542 | A | 5/1998 | Hoeptner, III |
| 5,788,443 | A | 8/1998 | Cabahug |
| 5,813,428 | A | 9/1998 | Almasy et al. |
| 5,890,241 | A | 4/1999 | Ball |
| 5,906,341 | A | 5/1999 | Brown |
| 5,911,240 | A | 6/1999 | Kolar et al. |
| 5,961,095 | A | 10/1999 | Schroff |
| 5,964,246 | A | 10/1999 | Meeker |
| D421,092 | S | 2/2000 | Martin |
| 6,041,611 | A | 3/2000 | Palmer |
| 6,047,723 | A | 4/2000 | Hoeptner, III |
| 6,132,138 | A | 10/2000 | Haese |
| 6,135,359 | A | 10/2000 | Almasy et al. |
| 6,142,172 | A | 11/2000 | Shuler et al. |
| 6,178,988 | B1 | 1/2001 | Royle |
| 6,186,558 | B1 | 2/2001 | Komolrochanaporn |
| D439,311 | S | 3/2001 | Martin |
| 6,206,039 | B1 | 3/2001 | Shuler et al. |
| 6,247,491 | B1 | 6/2001 | Petryna |
| 6,338,364 | B1 | 1/2002 | Mendenhall |
| 6,363,960 | B1 | 4/2002 | Gauss |
| 6,427,716 | B1 | 8/2002 | Hoeptner, III |
| 6,431,204 | B1 | 8/2002 | Ball |
| 6,447,017 | B1 | 9/2002 | Gilbreath et al. |
| 6,464,266 | B1 | 10/2002 | O'Neill et al. |
| 6,467,752 | B2 | 10/2002 | Woods |
| D470,915 | S | 2/2003 | Ball |
| 6,513,543 | B1 | 2/2003 | Noll et al. |
| 6,517,124 | B1 | 2/2003 | Le Quere |
| 6,526,701 | B2 | 3/2003 | Stearns et al. |
| 6,532,986 | B1 | 3/2003 | Dickey et al. |
| D473,631 | S | 4/2003 | Lai |
| 6,550,495 | B1 | 4/2003 | Schulze |
| 6,631,623 | B1 | 10/2003 | Ball |
| D482,431 | S | 11/2003 | Ball |
| 6,678,903 | B1 | 1/2004 | Rhodes |
| 6,679,473 | B1 | 1/2004 | Ball |
| 6,769,446 | B1 | 8/2004 | Ball et al. |
| 6,805,154 | B1 | 10/2004 | Dickey et al. |
| 6,816,072 | B2 | 11/2004 | Zoratti |
| 6,830,063 | B1 | 12/2004 | Ball |
| 6,857,442 | B1 | 2/2005 | Ball et al. |
| 6,860,523 | B2 | 3/2005 | O'Neill et al. |
| 6,880,573 | B2 | 4/2005 | Berkman et al. |
| 6,883,534 | B2 | 4/2005 | Ball et al. |
| 6,899,120 | B1 | 5/2005 | Motley |
| 6,948,509 | B1 | 9/2005 | Ball et al. |
| 6,948,518 | B1 | 9/2005 | Ball |
| 7,013,910 | B2 | 3/2006 | Tripp |
| D521,113 | S | 5/2006 | Ball |
| 7,059,937 | B2 | 6/2006 | Brown |
| RE39,235 | E | 8/2006 | Shuler et al. |
| 7,100,637 | B1 | 9/2006 | Ball |
| 7,111,875 | B2 | 9/2006 | Ball |
| 7,143,779 | B2 | 12/2006 | Parker |
| 7,234,479 | B2 | 6/2007 | Murdock |
| 7,234,732 | B2 | 6/2007 | Ball |
| 7,258,128 | B2 | 8/2007 | Gomo et al. |
| 7,314,057 | B2 | 1/2008 | Parker |
| D574,065 | S | 7/2008 | Ball |
| 7,434,593 | B2 | 10/2008 | Noll et al. |
| 7,472,718 | B2 | 1/2009 | Ball |
| 7,730,901 | B2 | 6/2010 | Ball |
| 8,042,565 | B2 | 10/2011 | Ball et al. |
| 8,408,238 | B1 | 4/2013 | Anderson |
| 8,474,476 | B2 | 7/2013 | Ball et al. ..... E03B 9/14 137/301 |
| 8,955,538 | B2 | 2/2015 | Ball et al. ..... E03B 9/14 137/301 |
| 9,228,327 | B2 | 1/2016 | Ball et al. ..... E03B 9/14 |
| 9,593,471 | B2 * | 3/2017 | Ball ..... E03B 9/14 |
| 9,890,867 | B2 | 2/2018 | Ball et al. |
| 2001/0003350 | A1 | 6/2001 | Gandy et al. |
| 2002/0189674 | A1 | 12/2002 | Meeder |
| 2005/0173001 | A1 | 8/2005 | Murdock |
| 2006/0117734 | A1 | 6/2006 | Larkin et al. |
| 2006/0254647 | A1 | 11/2006 | Ball |
| 2007/0039649 | A1 | 2/2007 | Ball |
| 2007/0044838 | A1 | 3/2007 | Ball |
| 2007/0044840 | A1 | 3/2007 | Ball et al. |
| 2007/0163653 | A1 | 7/2007 | Gomo et al. |
| 2007/0240765 | A1 | 10/2007 | Katzman et al. |
| 2008/0047612 | A1 | 2/2008 | Ball |
| 2009/0288722 | A1 * | 11/2009 | Ball ..... E03C 1/106 137/614.2 |
| 2017/0218602 | A1 | 8/2017 | Ball et al. |

OTHER PUBLICATIONS

U.S. Appl. No. 15/416,175, Notice of Allowance dated Nov. 21, 2018, 8 pages. (WMC-43-CON-4).

Canadian Official Action for Canada Patent Application No. 2,734,529, dated Jul. 20, 2012 2 pages.

Final Action for U.S. Appl. No. 13/933,264 dated Jul. 25, 2014, 10 pages.

Notice of Allowance for U.S. Appl. No. 12/126,476, dated Aug. 18, 2011.

Notice of Allowance for U.S. Appl. No. 13/048,445 dated Mar. 6, 2013, 8 pages.

Notice of Allowance for U.S. Appl. No. 13/933,264 dated Oct. 16, 2014, 5 pages.

Notice of Allowance for U.S. Appl. No. 14/623,730, dated Sep. 22, 2015, 5 pages.

Official Action for US. Appl. No. 12/126,476, dated Feb. 9, 2011.

Official Action for U.S. Appl. No. 12/126,476, dated Jun. 14, 2011.

Official Action for U.S. Appl. No. 13/933,264 dated Apr. 11, 2014, 17 pages.

Official Action for U.S. Appl. No. 14/623,730 dated Aug. 25, 2015 9 pages.

Official Action for U.S. Appl. No. 14/988,600 dated Sep. 21, 2016 9 pages.

U.S. Appl. No. 14/988,600, Notice of Allowance dated Jan. 5, 2017, 7 pages. (WMC-43-CON-3).

U.S. Appl. No. 15/416,175, Office Action dated Oct. 2, 2017, 8 pages (WMC-43-CON-4).

U.S. Appl. No. 15/416,175, Notice of Allowance dated Jan. 25, 2018, 7 pages. (WMC-43-CON-4).

U.S. Appl. No. 15/416,175, Office Action dated Aug. 28, 2019, 6 pages.

MPH-24 Pedestal Hydrant, MAPA Products, May 2002, 2 pages.

MPH-24D Pedestal Hydrant, MAPA Products, Apr. 2007, 1 page.

MPH-24FP Pedestal Hydrant, MAPA Products, Jan. 2004, 1 page.

MPH-24 Pedestal Hydrant, MAPA Products, Jan. 2004, 1 page.

"VB-222 Self-Draining Hose Connection Vacuum Breaker," A.W. Cash Value Company Model VB-222, Mar. 12, 2008, pp. 1-2.

Notice of Allowance for U.S. Appl. No. 13/048,445 mailed Mar. 6, 2013, 8 pages.

(56) References Cited

OTHER PUBLICATIONS

Official Action for U.S. Appl. No. 13/933,264 mailed Apr. 11, 2014, 17 pages.
Final Action for U.S. Appl. No. 13/933,264 mailed Jul. 25, 2014, 10 pages.
Notice of Allowance for U.S. Appl. No. 13/933,264 mailed Oct. 16, 2014, 5 pages.
Official Action for U.S. Appl. No. 14/623,730 mailed Aug. 25, 2015 9 pages.
Notice of Allowance for U.S. Appl. No. 14/623,730, mailed Sep. 22, 2015, 5 pages.
U.S. Appl. No. 15/238,914, filed Aug. 17, 2016, Ball et al.

* cited by examiner

AMENDED

AMENDED

AMENDED (PRIOR ART) AMENDED

HYDRANT ON.
FLOW THROUGH DIVERTER.

(PRIOR ART) AMENDED

WATER DIVERTED THROUGH BACKFLOW PREVENTER (PRIOR ART) AMENDED

HYDRANT OFF.
HYDRANT DRAINING INTO RESERVOIR

| | WOODFORD S3 | WOODFORD S4H | FIGS.5-11 | FIGS.16-18 | FIG.19 |
|---|---|---|---|---|---|
| VACUUM BREAKER USED TO PASS ASSE 1057 | 34HF | 34HF | DC 50 HF | DC 50 HF | DC 50 HF |
| OPERATION CYCLE | 1) TURN ON AND EVACUATE 30 SECONDS 2) RUN THROUGH HOSE 3) SHUT OFF | 1) TURN ON RUN THROUGH HOSE 2) SHUT OFF 3) TURN ON AND EVACUATE 30 SECONDS 4) SHUT OFF | 1) TURN ON RUN THROUGH HOSE 2) SHUT OFF AND REMOVE HOSE 3) TURN ON AND EVACUATE 30 SECONDS 4) SHUT OFF | 1) TURN ON RUN THROUGH HOSE 2) SHUT OFF AND REMOVE HOSE 3) TURN ON AND EVACUATE 15 SECONDS 4) SHUT OFF | 1) TURN ON RUN THROUGH HOSE 2) SHUT OFF AND REMOVE HOSE 3) TURN ON AND EVACUATE 30 SECONDS 4) SHUT OFF |
| DRAIN TO RESERVOIR WITH HOSE ATTACHED | YES | YES | NO | NO | NO |
| WORK WITH SPRAY NOZZLE ATTACHED | YES | YES | YES | YES | YES |
| OPERATIONAL STEP OF WHEN TO EVACUATE RESERVOIR, WITH HOSE ATTACHED | FIRST OR LAST | LAST | LAST | LAST | LAST |
| SPECIAL INSTRUCTIONS | EVACUATE RESERVOIR ONLY THROUGH DIVERTER | EVACUATE RESERVOIR ONLY THROUGH DIVERTER | EVACUATE WITHOUT HIGH FLOW BUTTON PUSHED OR HOSE ATTACHED | EVACUATE WITHOUT HOSE ATTACHED | EVACUATE WITHOUT HOSE ATTACHED |
| PVC RISER | 4" | 3" | 3" | 3" | 11/2" |
| FLOW RATE @ 60 PSI (1057 APPROVED HYDRANT | 7 | 7 | 8.4 | 6.2 | 6 |
| HEAD USED | WOODFORD Y2 | WOODFORD S4H | WOODFORD Y34 | WOODFORD W34 | WOODFORD Y34 |
| # OF O-RINGS IN DESIGN | 3 | 2 | 5 | 3 | 2 |
| # OF STATIC SEAL O-RINGS IN DESIGN | 2 | 2 | 1 | 0 | 0 |
| MAXIMUM BURY DEPTH | 7' | 7' | 7' | 5' | 2' |
| MINIMUM OPERATION PRESSURE | 20 PSI | 20 PSI | 20 PSI | 40 PSI | 25 PSI |
| ADA COMPLAINT | NO | YES | NO | NO | NO |
| INLET SIZE | 1" | 1" | 3/4" | 1/2" | 1/2" |
| TIME TO EVACUATE RESERVOIR @MAX BURY AND MIN PSI | 45 | 45 | 30 | 15 | 30 |

FIG.20

SANITARY HYDRANT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application is *a reissue of U.S. patent application Ser. No. 14/988,600, filed Jan. 5, 2016, issued as U.S. Pat. No. 9,593,471, which is* a continuation of U.S. patent application Ser. No. 14/623,730, filed Feb. 17, 2015, now U.S. Pat. No. 9,228,327, *which is a continuation of U.S. patent application Ser. No. 13/933,264, filed Jul. 2, 2013, now U.S. Pat. No. 8,955,538,* which is a continuation of U.S. patent application Ser. No. 13/048,445, filed Mar. 15, 2011, now U.S. Pat. No. 8,474,476, which claims the benefit of U.S. Provisional Patent Application Ser. No. 61/313,902, filed Mar. 15, 2010, and U.S. Provisional Patent Application Ser. No. 61/313,918, filed Mar. 15, 2010, the entire disclosures of which are incorporated by reference herein. *To the extent appropriate, a claim for priority is made to each of the above-recited applications.*

This application is also related to U.S. Pat. No. 8,042,565, U.S. Pat. No. 7,472,718, and U.S. Pat. No. 7,730,901, the entire disclosures of which are incorporated by reference herein.

*The owner, WCM Industries, Inc., with a 100% percent interest in the instant application hereby disclaims, except as provided below, the terminal part of the statutory term of any patent granted on the instant application which would extend beyond the expiration date of the full statutory term of the prior U.S. Pat. No. 8,474,476 as the term of said prior patent is presently shortened by any terminal disclaimer. The owner hereby agrees that any patent so granted on the instant application shall be enforceable only for and during such period that it and the prior patent are commonly owned. This agreement runs with any patent granted on the instant application and is binding upon the grantee, its successors or assigns.*

*In making the above disclaimer, the owner does not disclaim the terminal part of the term of any patent granted on the instant application that would extend to the expiration date of the full statutory term of the prior patent, "as the term of said prior patent is presently shortened by any terminal disclaimer," in the event that said prior patent later:*

- *expires for failure to pay a maintenance fee;*
- *is held unenforceable;*
- *is found invalid by a court of competent jurisdiction;*
- *is statutorily disclaimed in whole or terminally disclaimed under 37 CFR 1.321;*
- *has all claims canceled by a reexamination certificate;*
- *is reissued; or*
- *is in any manner terminated prior to the expiration of its full statutory term as presently shortened by any terminal disclaimer.*

FIELD OF THE INVENTION

Embodiments of the present invention are generally related to contamination proof hydrants that employ a venturi that facilitates transfer of fluid from a self-contained water storage reservoir.

BACKGROUND OF THE INVENTION

Hydrants typically comprise a head interconnected to a water source by way of a vertically oriented standpipe that is buried in the ground or interconnected to a fixed structure, such as a roof. To be considered "freeze proof" hydrant water previously flowing through the standpipe must be directed away from the hydrant after shut off. Thus many ground hydrants 2 currently in use allow water to escape from the standpipe 6 from a drain port 10 located below the "frost line" 14 as shown in FIG. 1.

Hydrants are commonly used to supply water to livestock that will urinate and defecate in areas adjacent to the hydrant. It follows that the animal waste will leach into the ground. Thus a concern with freeze proof hydrants is that they may allow contaminated ground water to penetrate the hydrant through the drain port when the hydrant is shut off. More specifically, if a vacuum, i.e., negative pressure, is present in the water supply, contaminated ground water could be drawn into the standpipe and the associated water supply line. Contaminants could also enter the system if pressure of the ground water increases. To address the potential contamination issue, "sanitary" yard hydrants have been developed that employ a reservoir that receives water from the standpipe after hydrant shut off.

There is a balance between providing a freeze proof hydrant and a sanitary hydrant that is often difficult to address. More specifically, the water stored in the reservoir of a sanitary hydrant could freeze which can result in hydrant damage or malfunction. To address this issue, attempts have been made to ensure that the reservoir is positioned below the frost line or located in an area that is not susceptible to freezing. These measures do not address the freezing issue when water is not completely evacuated from the standpipe. That is, if the reservoir is not adequately evacuated when the hydrant is turned on, the water remaining in the reservoir will effectively prevent standpipe water evacuation when the hydrant is shut off, which will leave water above the frost line.

To help ensure that all water is evacuated from the reservoir, some hydrants employ a venturi system. A venturi comprises a nozzle and a decreased diameter throat. When fluid flows through the venturi a pressure drop occurs at the throat that is used to suction water from the reservoir. That is, the venturi is used to create an area of low pressure in the fluid inlet line of the hydrant that pulls the fluid from the reservoir when fluid flow is initiated. Sanitary hydrants that employ venturis must comply with ASSE-1057, ASSE-0100, and ASSE-0152 that require that a vacuum breaker or a backflow preventer be associated with the hydrant outlet to counteract negative pressure in the hydrant that may occur when the water supply pressure drops from time-to-time which could draw potentially contaminated fluid into the hydrant after shut off. Internal flow obstructions associated with the vacuum breakers and backflow preventers will create a back pressure that will affect fluid flow through the hydrant. More specifically, common vacuum breakers and backflow preventers employ at least one spring-biased check valve. When the hydrant is turned on spring forces are counteracted and the valve is opened by the pressure of the fluid supply, which negatively influences fluid flow through the hydrant. In addition an elongated standpipe will affect fluid flow. These sources of back pressure influence flow through the venturi to such a degree that a pressure drop sufficient to remove the stored water from the reservoir will not be created. Thus to provide fluid flow at a velocity required for proper functioning of the venturi, fluid diverters or selectively detachable backflow preventers, i.e., those having a quick disconnect capability, have been used to avoid the back pressure associated with the vacuum breakers of backflow preventers. In operation, as shown in FIG. 2, the diverter is used initially for about 45 seconds to ensure reservoir evacuation. Then, the diverter is disengaged so that the water will flow through the backflow preventer or vacuum breaker. The obvious drawback of this solution is that the diverter must be manually actuated and the user must allow water to flow for a given amount of time, which is wasteful.

Further, as the standpipe gets longer it will create more backpressure, i.e., head pressure, that reduces the flow of water through the venturi, and at some point a venturi of any design will be unable to evacuate the water in the reservoir. That is, the amount of time it takes for a hydrant to evacuate the water into the reservoir depends on the height/length of the standpipe as well as the water pressure. The evacuation time of roof hydrants of embodiments of the present invention, which has a 42" standpipe, is 5 seconds at 60 psi. The evacuation time will increase with a lower supply pressure or increased standpipe length or diameter. Currently existing hydrants have evacuation times in the 30 second range.

Another way to address the fluid flow problem caused by vacuum breakers is to provide a reservoir with a "pressure system" that is capable of holding a pressure vacuum that is used to suction water from the standpipe after hydrant shut off. During normal use the venturi will evacuate at least a portion of the fluid from the reservoir. Supply water is also allowed to enter the reservoir which will pressurize any air in the reservoir that entered the reservoir when the reservoir was at least partially evacuated. When flow through the hydrant is stopped, the supply pressure is cut off and the air in the reservoir expands to created a pressure drop that suctions water from the standpipe into the reservoir. If the vacuum produced is insufficient, which would be attributed to incomplete evacuation of the reservoir, water from the standpipe will not drain into the reservoir and water will be left above the frost line.

Other hydrants employ a series of check valves to prevent water from entering the reservoir during normal operations. Hydrants that employ a "check system" uses a check valve to allow water into or out of the reservoir. When the hydrant is turned on, the check valve opens to allow the water to be suctioned from the reservoir. The check also prevents supply water from flowing into the reservoir during normal operations, which occurs during the operation of the pressure vacuum system. When the hydrant is shut off, the check valve opens to allow the standpipe water to drain into the reservoir. One disadvantage of a check system is that it requires a large diameter reservoir to accommodate the check valve. Thus a roof hydrant would require a larger roof penetration and a larger hydrant mounting system, which may not be desirable.

Another issue associated with both the pressure vacuum and check systems is that there must be a passageway or vent that allows air into the reservoir so that when a hydrant is turned on, the water stored in the reservoir can be evacuated. If the reservoir was not exposed to atmosphere, the venturi would not create sufficient suction to overcome the vacuum that is created in the reservoir.

SUMMARY OF THE INVENTION

It is one aspect of embodiments of the present invention to provide a sanitary and freeze proof hydrant that employs a venturi for suctioning fluid from a fluid storage reservoir. As one of skill in the art will appreciate, the amount of suction produced by the venturi is a function of geometry. More specifically, the contemplated venturi is comprised of a nozzle with an associated throat. Water traveling through the nozzle creates an area of low pressure at or near the throat that is in fluid communication with the reservoir. In one embodiment, the configuration of the nozzle and throat differs from existing products. That is, the contemplated nozzle is configured such that the venturi will operate in conjunction with a vacuum breaker, a double check backflow preventer, or a double check backflow prevention device as disclosed in U.S. Patent Application Publication No. 2009/0288722, which is incorporated by reference in its entirety herein, without the need for a diverter. Preferably, embodiments of the present invention are used in conjunction with the double check backflow prevention device of the '722 publication as it is less disruptive to fluid flow than the backflow preventers and vacuum breakers of the prior art.

While the use of a venturi is not new to the sanitary yard hydrant industry, the design features of the venturi employed by embodiments of the present invention are unique in the way freeze protection is provided. More specifically, current hydrants employ a system that allows water to bypass a required vacuum breaker. For example, the Hoeptner Freeze Flow Hydrant employs a detachable vacuum breaker and the Woodford Model S3 employs a diverter. Again, fluid diversion is needed so that sufficient fluid flow is achieved for proper venturi functions. The venturi design of sanitary hydrants of the present invention is unique in that the venturi will function properly when water flows through the vacuum breaker or double check backflow preventer—no fluid diversion at the hydrant head is required. This allows the hydrant to work in a way that is far more user friendly, because the hydrant is able to maintain its freeze resistant functionality without requiring the user to open a diverter, for example. Embodiments of the present invention are also environmentally friendly as resources are conserved by avoiding flowing water out of a diverter.

It is another aspect of the embodiments of the invention is to provide a hydrant that operates at pressures from about 20 psi to 125 psi and achieves a mass flow rate above 3 gallons per minute (GPM) at 25 psi, which is required by code. One difficult part of optimizing the flow characteristics to achieve these results is determining the nozzle diameter. It was found that a throat diameter change of about 0.040 inches would increase the mass flow rate by 2 GPM. That same change, however, affects the operation of the venturi. For example, hydrants with a nozzle diameter of 0.125 inches will provide acceptable reservoir evacuation but would not have the desired mass flow rate. A 0.147 inch diameter nozzle will provide an acceptable mass flow rate, but reservoir evacuation time was sacrificed. In one embodiment of the present invention a venturi having a nozzle diameter of about 0.160 inches is employed.

It is another aspect of the present invention to provide a nozzle having an exit angle that facilitates fluid flow through the venturi. More specifically, the nozzle exit of one embodiment possesses a gradual angle so that fluid flowing through the venturi maintains fluid contact with the surface of the nozzle and laminar flow is generally achieved. In one embodiment the exit angle is between about 4 to about 5.6 degrees. For example, nozzle exit having very gradual surface angle, e.g. 1-2 degrees, will evacuate the reservoir more quickly, but would require an elongated venturi. Thus, an elongated venturi may be used to reduce back pressure associated with the venturi, but doing so will add cost. The nozzle inlet may have an angle that is distinct from that of the exit to facilitate construction of the venturi by improving the machining process.

It is thus one aspect of the present invention to provide a sanitary hydrant, comprising: a standpipe having a first end and a second end; a head for delivering fluid interconnected to said first end of said standpipe; a fluid reservoir associated with said second end of said standpipe; a venturi positioned within said reservoir and interconnected to said second end of said standpipe, said venturi comprised of a first end, which is interconnected to said standpipe, and a second end associated with a fluid inlet valve with a throat between said first end and said second end of said venturi; a bypass tube having a first end interconnected to a location adjacent to said first end of said venturi and a second end interconnected to a bypass valve, said bypass valve also associated with said second end of said venturi, wherein when said bypass valve is opened, fluid flows from said inlet valve, through said bypass tube, through said standpipe, and out said hydrant head; and wherein when said bypass valve is closed, fluid flows through said venturi, thereby creating a pressure drop adjacent to said throat that communicates with said reservoir to draw fluid therefrom.

It is another aspect to provide a method of evacuating a sanitary hydrant, comprising: providing a standpipe having a first end and a second end; providing a head for delivering fluid interconnected to said first end of said standpipe; providing a fluid reservoir associated with said second end of said standpipe; providing a venturi positioned within said reservoir and interconnected to said second end of said standpipe, said venturi comprised of a first end, which is interconnected to said standpipe, and a second end associated with a fluid inlet valve with a throat between said first end and said second end of said venturi; providing a bypass tube having a first end interconnected to a location adjacent to said first end of said venturi and a second end interconnected to a bypass valve, said bypass valve also associated with said second end of said venturi, wherein when said bypass valve is opened, fluid flows from said inlet valve, through said bypass tube, through said standpipe, and out said hydrant head; and wherein when said bypass valve is closed, fluid flows through said venturi, thereby creating a pressure drop adjacent to said throat that communicates with said reservoir to draw fluid therefrom initiating fluid flow through said head by actuating a handle associated therewith; actuating a bypass button that opens the bypass valve such that fluid is precluded from entering said venturi; actuating said bypass button to close said bypass valve; flowing fluid through said venturi; evacuating said reservoir; ceasing fluid flow through said hydrant; and draining fluid into said reservoir.

The Summary of the Invention is neither intended nor should it be construed as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention. Additional aspects of the present invention will become more readily apparent from the Detail Description, particularly when taken together with the drawings.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

FIG. 14 is a detailed cross sectional view of FIG. 13 showing the check valve in a closed position when the hydrant is on;

FIG. 20 is a table showing a comparison of various hydrant assemblies and the operation cycle of each.

Figures 1A, 1B, 1C:
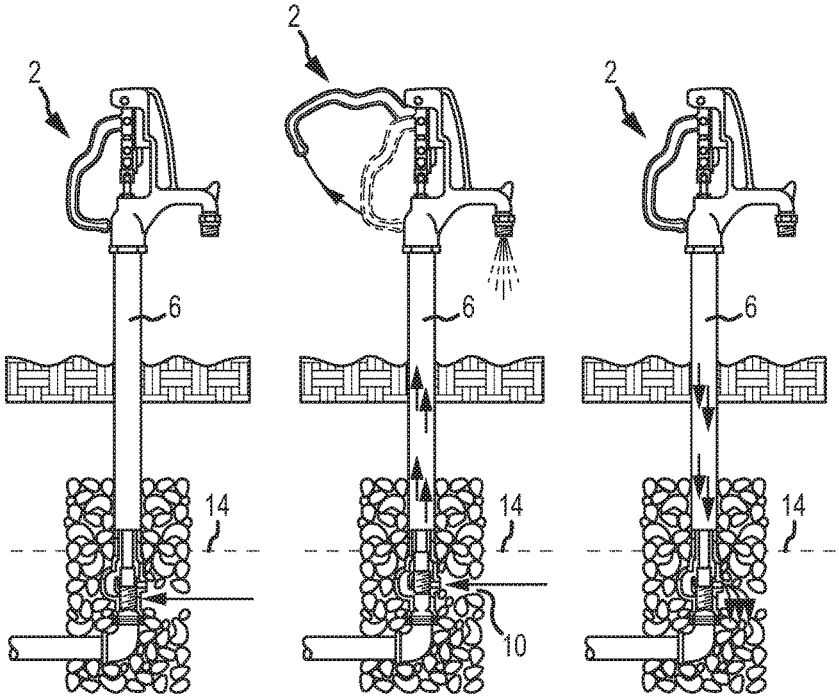
FIG.1A (PRIOR ART)
FIG.1B (PRIOR ART)
FIG.1C (PRIOR ART)
FIGS. 1A-1C are a depiction of the operation of a hydrant of the prior art.

It should be understood that the drawings are not necessarily to scale, but that relative dimensions nevertheless can be determined thereby. In certain instances, details that are not necessary for an understanding of the invention or that render other details difficult to perceive may have been omitted. It should be understood, of course, that the invention is not necessarily limited to the particular embodiments illustrated herein.

To assist in the understanding of one embodiment of the present invention the following list of components and associated numbering found in the drawings is provided herein:

| # | Component |
|---|---|
| 2 | Hydrant |
| 4 | Head |
| 5 | Handle |
| 6 | Standpipe |
| 10 | Drain port |
| 14 | Frost line |
| 18 | Venturi |
| 22 | Diverter |
| 26 | Vacuum breaker |
| 30 | Siphon tube |
| 34 | Check valve |
| 36 | Outlet |
| 37 | Venturi vacuum inlet and drain port |
| 38 | Hydrant inlet valve |
| 42 | Bypass |
| 46 | Bypass button |
| 50 | Casing cover |
| 54 | Piston |
| 56 | Bypass valve |
| 57 | Control rod |
| 58 | Secondary spring operated piston |
| 59 | Bottom surface |
| 60 | EFR button |
| 64 | LED |
| 68 | Screen piston |
| 72 | Reservoir |
| 76 | Check valve piston |
| 80 | Vent |

DETAILED DESCRIPTION

Figure 2A:
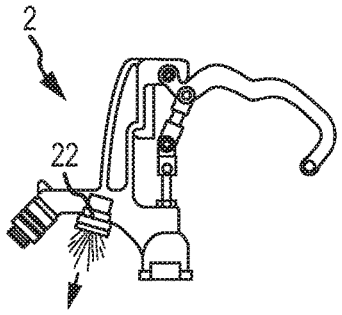
FIGS. 2A-2C are a series of figures depicting the use of a flow diverter of the prior art.
Figure 2B:
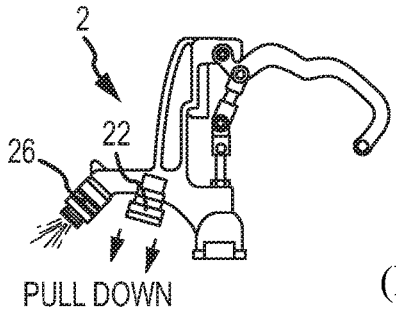
Figure 2C:
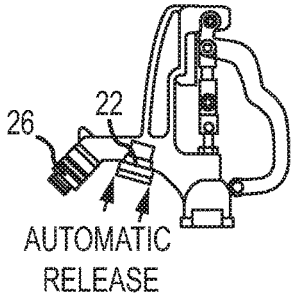
Figure 3:
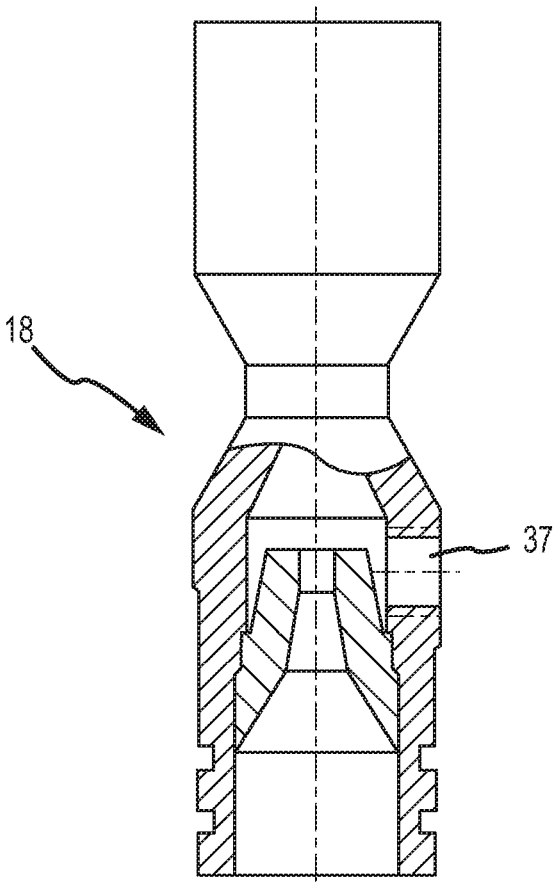
FIG.3 (PRIOR ART)
FIG. 3 is a cross section of a venturi of the prior art.
Figure 4:
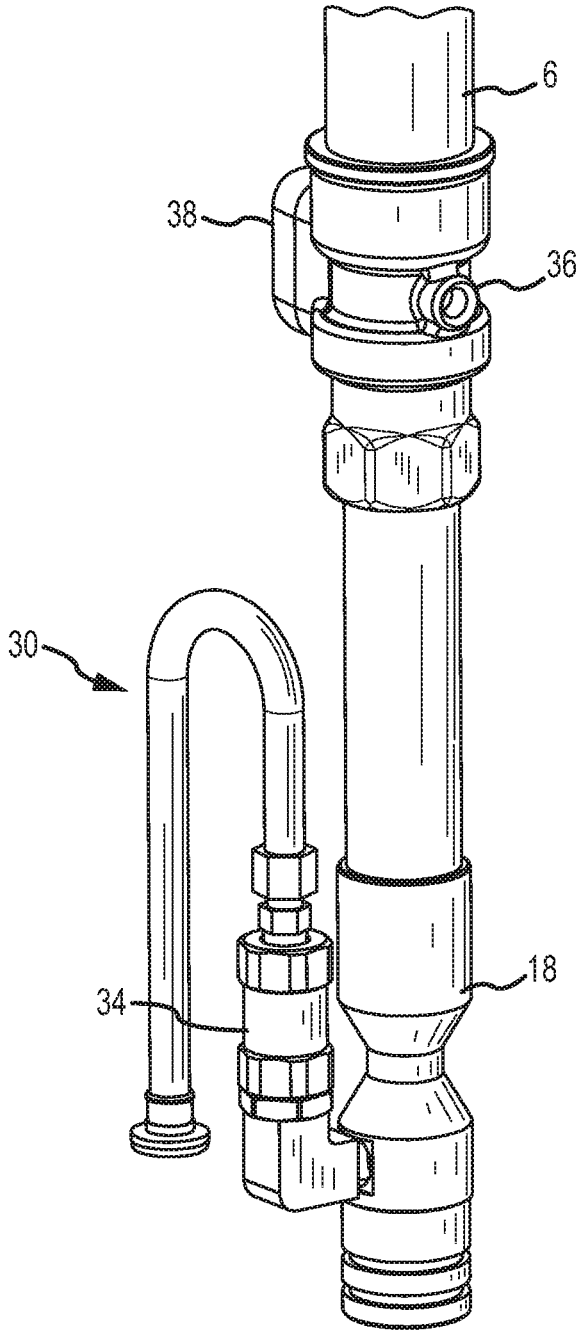
FIG.4 (PRIOR ART)
FIG. 4 is a perspective view of a venturi system employed by the prior art.
Figure 5:
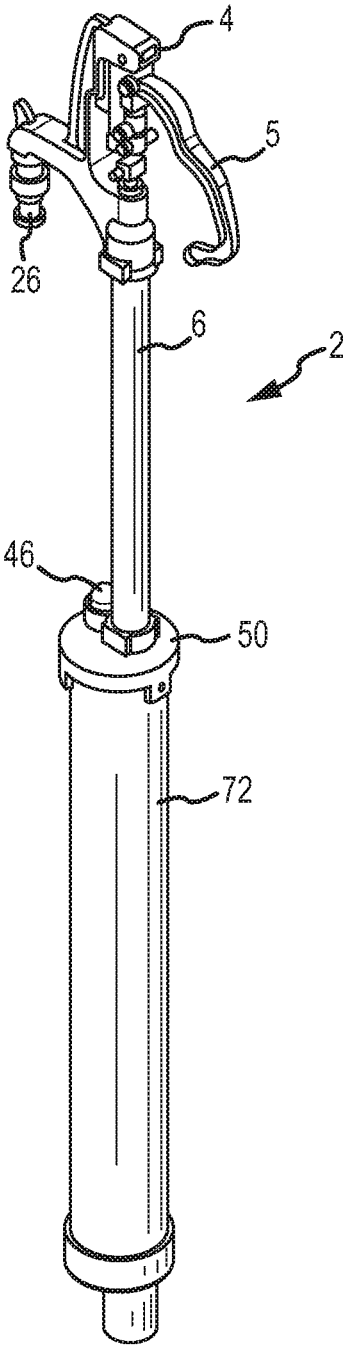
FIG. 5 is a perspective view of one embodiment of the present invention.
Figure 6:
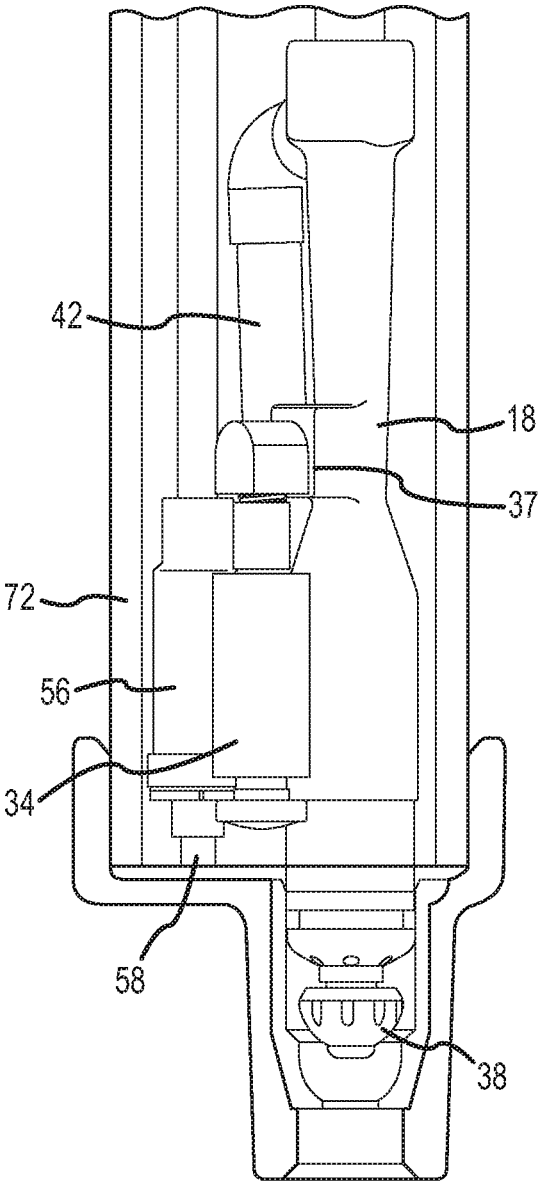
FIG. 6 is a detailed view of the venturi system of the embodiment of FIG. 5.
Figure 7:
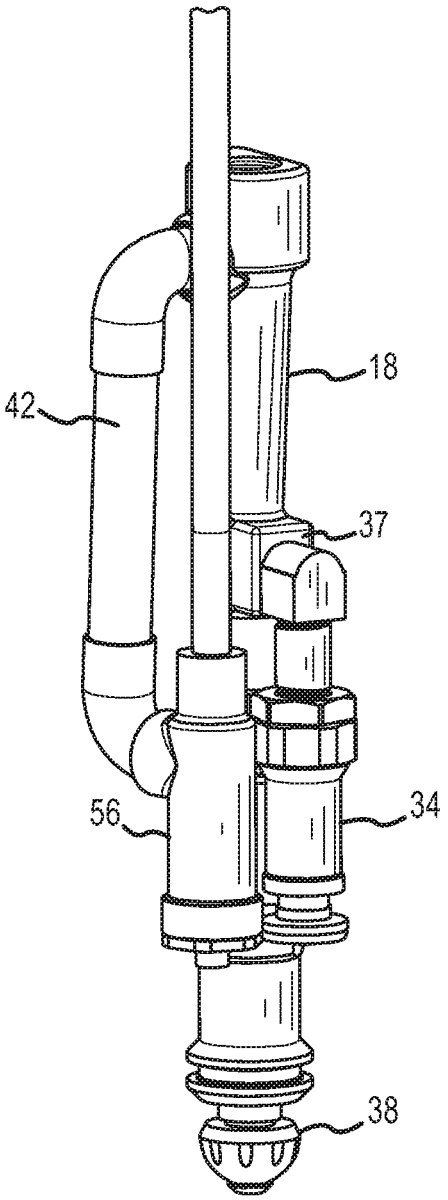
FIG. 7 is a perspective view similar to that of FIG. 6 wherein the reservoir has been omitted for clarity.
Figure 8:
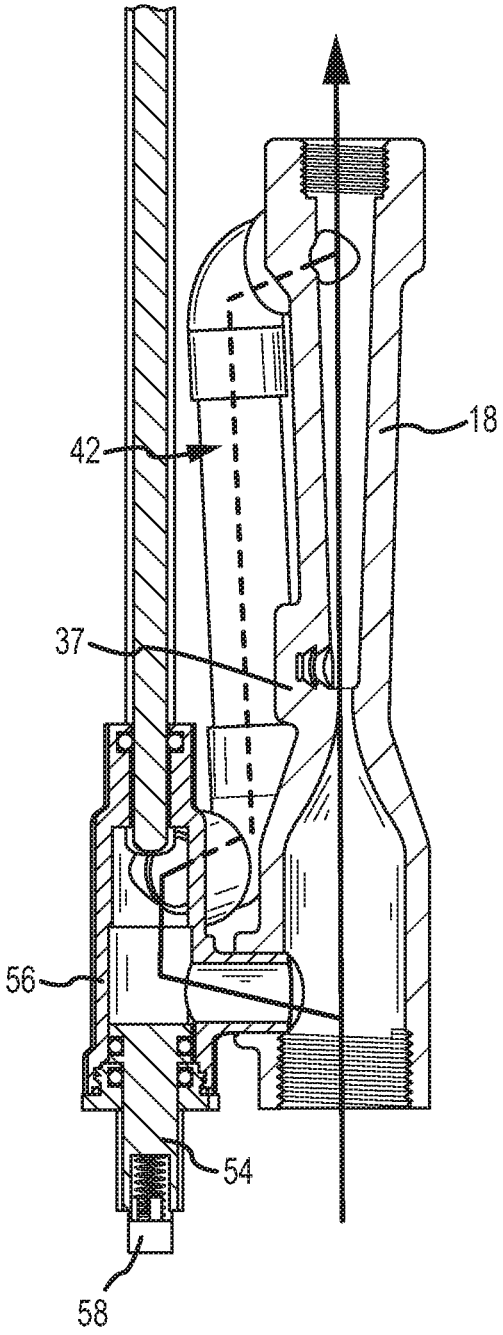
FIG. 8 is a cross sectional view of a venturi system that employs a bypass tube of one embodiment of the present invention.

The venturi 18 and related components used in the hydrants of the prior art is shown in FIGS. 3 and 4 and functions when the hydrant issued in conjunction with a vacuum breaker and a diverter. The diverter is needed to allow the venturi to work properly in light of the flow obstructions associated with the vacuum breaker. A typical on/off cycle for this hydrant (see also FIG. 2) requires that the user open the hydrant to cause water to exit the diverter 22 and not the vacuum breaker 26. As the water flows out of the diverter 22, a vacuum is created that draws water through a siphon tube 30 and check valve 34, which evacuates the reservoir (not shown). Flowing water through the diverter 22 for about 30 to 45 seconds will generally evacuate the reservoir. Next, as shown in FIG. 2, the diverter 22 is pulled down to redirect the water out of the vacuum breaker 26. The vacuum breaker 26 allows the hydrant 2 to be used with an attached hose and/or a spray nozzle as the vacuum breaker 26 will evacuate the head when the hydrant 2 is shut off, thereby making it frost proof. When the water is flowing out of the vacuum breaker 26 the venturi 18 will stop working and the one-way check valve 34 will prevent water from entering the reservoir. Once the hydrant is shut off, the water in the standpipe 6 will drain through a venturi vacuum inlet and drain port 37 that is in fluid communication with the reservoir similar to that disclosed in U.S. Pat. No. 5,246,028 to Vandepas, which is incorporated by reference herein. The check valve 34 is also pressurized when the hydrant is turned off because the shut off valve 38 is located above the check valve 34.

A venturi assembly used in other hydrants that employ a pressurized reservoir also provides a vacuum only when water flows through a diverter. A typical on/off cycle for a hydrant that uses this venturi configuration is similar to that described above, the exception being that a check valve that prevents water from entering the reservoir is not used. When the diverter is transitioned so water flows through the vacuum breaker, the backpressure created thereby will cause water to fill and pressurize the reservoir, which prevents water ingress after hydrant shut off. As the reservoir is at least partially filled with water during normal use, the user needs to evacuate the hydrant after shut off by removing any interconnected hose and diverting fluid for about 30 seconds, which will allow the venturi to evacuate the water from the reservoir.

Figure 9:
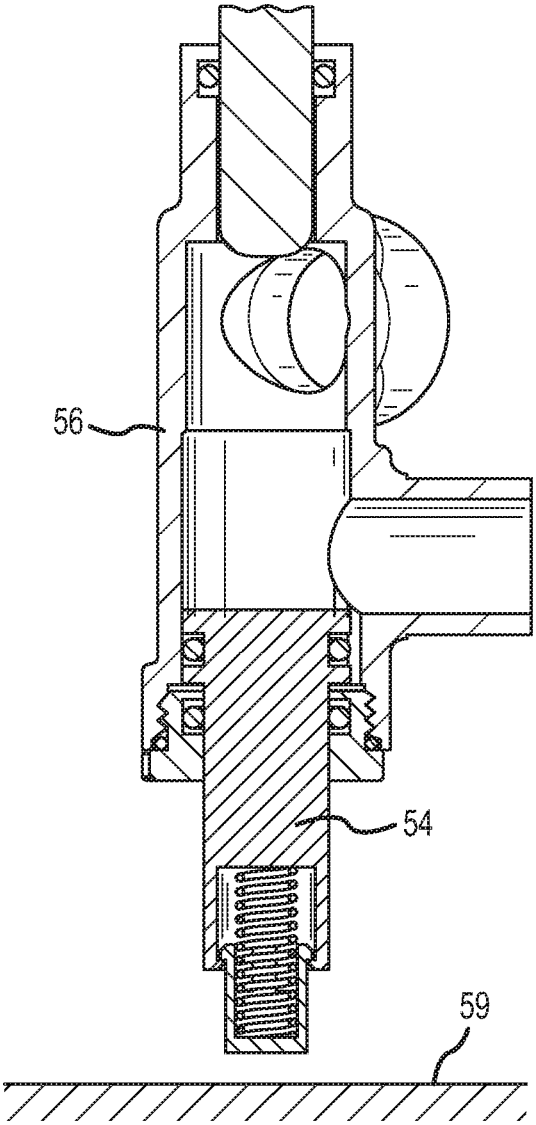
FIG. 9 is a cross sectional view of a bypass valve used in conjunction with the embodiment of FIG. 5 shown in an open position.
Figure 10:
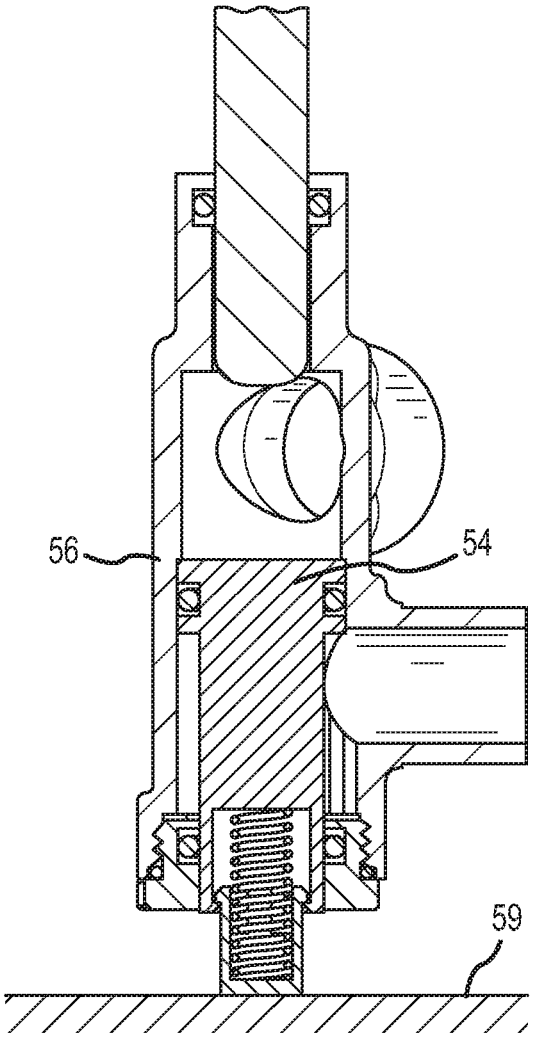
FIG. 10 shows the bypass valve of FIG. 9 in a closed position.
Figure 11:
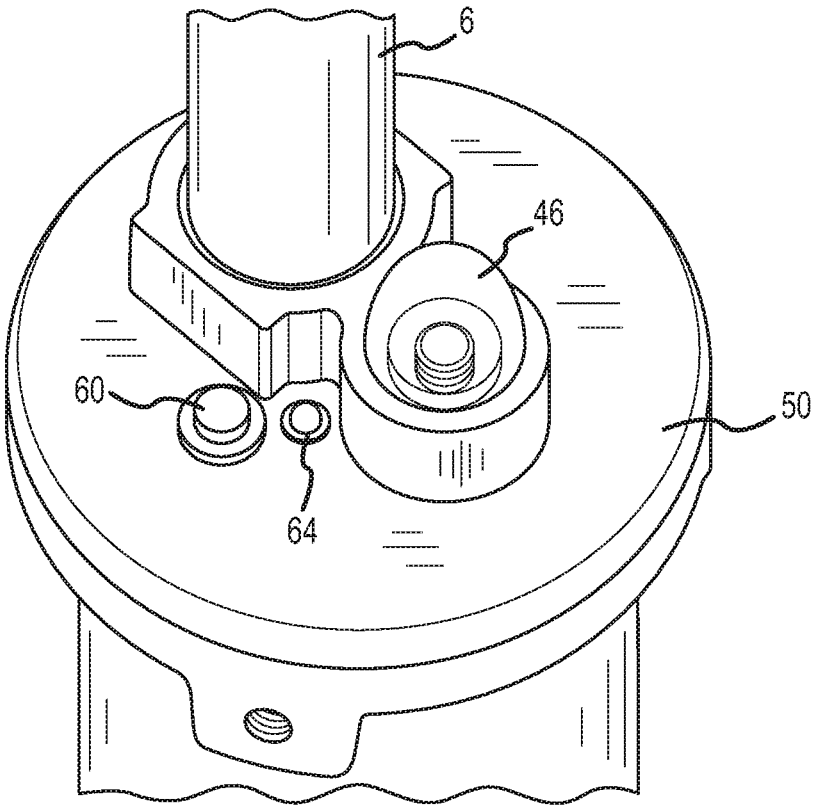
FIG. 11 is a top perspective view of one embodiment of the present invention showing a bypass button and an electronic reservoir evacuation button.

A hydrant of embodiments of the present invention shown in FIGS. 5-11 which may employ a venturi with an about ⅛" diameter nozzle. To account for the decrease in mass flow and associated back pressure that affects the functionality of the venturi described above, a bypass 42 is employed. More specifically, the bypass 42 maintains the flow rate out of the hydrant head 4 and allows for water to be expelled from the head 4 at the expected velocity. Fluid bypass is triggered by actuating a button 46 located on the casing cover 50 as shown in FIG. 11. When the hydrant is turned on the user pushes the bypass button 46 that will in turn move a bypass piston 54 of a bypass valve 56 into the open position as shown in FIG. 9. This will allow water to bypass the venturi 2 and re-enter the standpipe above the restriction caused by the venturi. The increased flow rate is greater than could be achieved with a venturi alone, even if the diameter of the venturi nozzle was increased.

While the bypass allows the mass flow rate to increase greatly, it also causes the venturi to stop creating a vacuum that is needed to evacuate the reservoir. Before normal use, the bypass piston 54 is closed as shown in FIG. 10. Similar to the system described in FIG. 16 below, the venturi 18 and associated bypass 42 are associated with a control rod 57 that is associated with the hydrant handle 5. Opening of the hydrant transitions the control rod 57 upwardly, which pulls the venturi 18 and associated bypass 42 upwardly and opens the hydrant inlet valve 38 to initiate fluid flow. Conversely, transitioning the hydrant handle 5 to a closed position will move the venturi 18 and associated bypass 42 downwardly such that a secondary spring operated piston 58 of the bypass valve 56 well contact a bottom surface 59 of the reservoir. As the secondary spring piston 58 contacts the bottom surface 59, the bypass valve 54 moves to a closed position as shown in FIG. 10. Moving the handle 5 to an open position to initiate fluid flow through the hydrant head will separate the secondary spring operated piston 58 from the bottom surface 59 of the reservoir which allows the bypass piston 54 to move to an open position as shown in FIG. 9 when the bypass button 46 is actuated. When the bypass 42 is in the closed position, water is forced to flow through the venturi causing a vacuum to occur, thereby causing the reservoir to be evacuated each time the hydrant is used. After water flows from the vacuum breaker for a predetermined time, the user will actuate the bypass button 46 which opens the bypass valve 56 to divert fluid around the venturi 2. The secondary spring operated piston 58, which is designed to account for tolerances making assembly of the hydrant easier. The secondary spring operated piston 58 also makes sure the hydrant will operate properly if there are any rocks or debris present in the hydrant reservoir.

The venturi 18 of this embodiment can be operated in a 7' bury hydrant with a minimum operating pressure of 25 psi. The other major exception is the addition of the aforementioned bypass valve 56 that allows the hydrant to achieve higher flow rates.

In operation with a hose, initially the hose is attached to the backflow preventer 26 or the bypass button is pushed to that the venturi will not operate correctly and the one way check valve 34 will be pressurized in such a way to prevent flow of fluid from the reservoir. After the hydrant is shut off, the hose is removed from vacuum breaker 26. Next the hydrant 2 is turned on and water flows through the vacuum breaker 26 for about 30 seconds. When there is no hose attached, and the bypass has not been activated, the venturi 18 will create a vacuum that suctions water from the reservoir 72 and making the hydrant frost proof. Thus when the hydrant is later shut off, the check valve piston will move up and force open the one way check valve 37 to allow water in the hydrant to drain into the reservoir. This operation will also reset the bypass valve 56 into the closed position.

Some embodiments of the present invention will also be equipped with an Electronic Freeze Recognition (EFR) device as shown in FIG. 11. The EFR includes a button 60 that allows the user to ascertain if the water has been evacuated from the standpipe 6 properly and if the hydrant is ready for freezing weather. The device uses a circuit board in concert with a dual color LED 64 as shown in FIG. 11 to warn the operator of a potential freezing problem. When the EFR button 60 is pushed and the LED 64 glows red it indicates that the hydrant has not been evacuated properly. This informs the operator that the water in the reservoir is above the frost line, and the hydrant needs to be evacuated by the method described above. A green LED 64 indicates the hydrant has been operated properly and the hydrant is ready for freezing weather.

Figure 12:
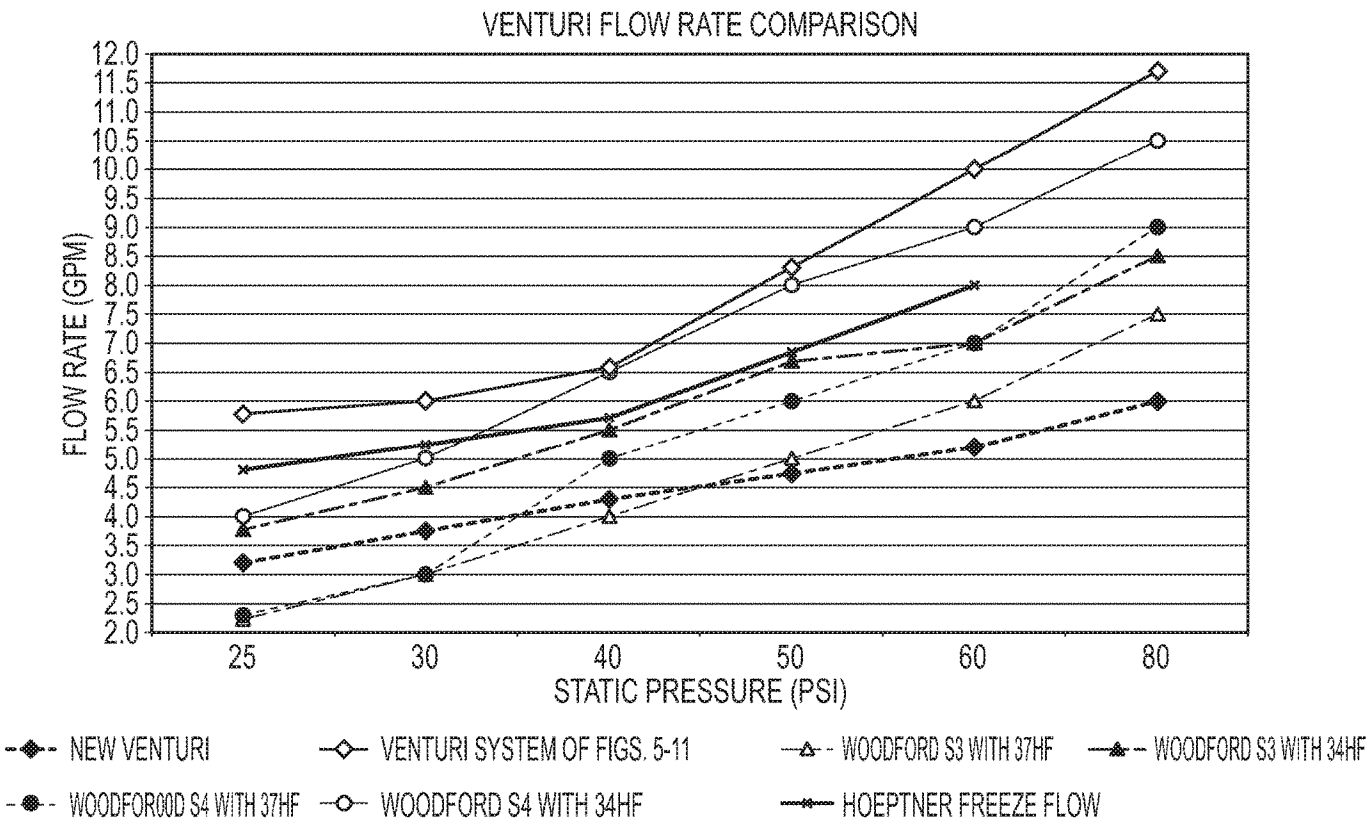
FIG. 12 is a graph showing sanitary hydrant comparisons.

Flow rates for hydrants of embodiments of the present invention compare favorably with existing sanitary hydrants on the market, see FIG. 12. The prior art models are compared with hydrants that use a vacuum breaker and hydrants that use a double check backflow preventer. The venturi and related bypass system will meet ASSE 1057 specifications.

Figure 13:
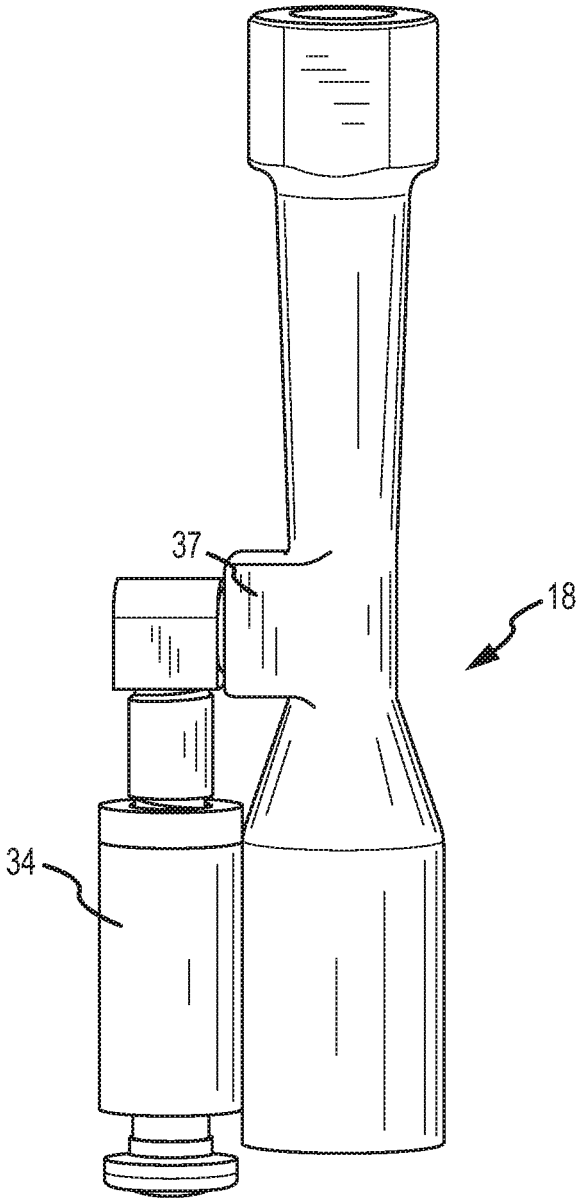
FIG. 13 is a perspective view of a venturi system of another embodiment of the present invention.
Figure 14:
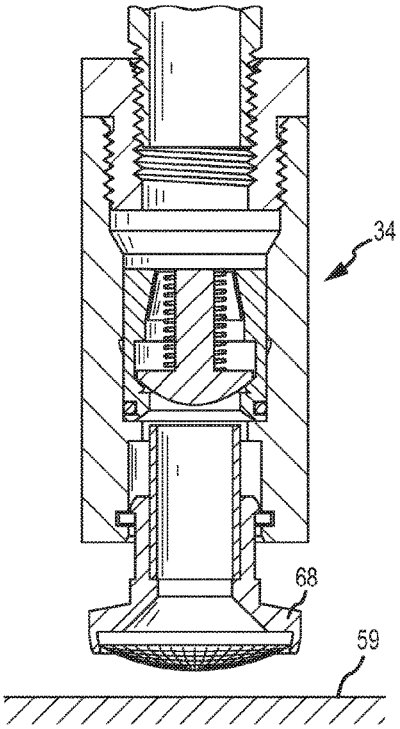
Figure 15:
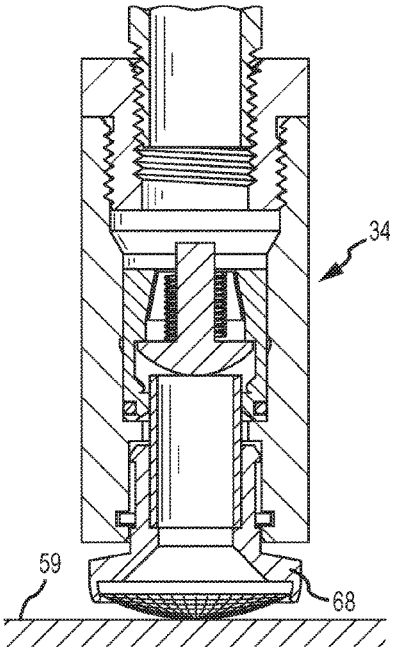
FIG. 15 is a detailed cross sectional view of FIG. 13 showing the check valve in an open position when the hydrant is off.

Another embodiment of the present invention is shown in FIGS. 13-15 that does not employ a bypass. Variations of this embodiment employ an about 0.147 to an about 0.160 diameter nozzle, which allows for a flow rate of 3 gallons per minute at 25 psi and evacuation of the reservoir at 20 psi. As this configuration meets the desired mass flow characteristics, a bypass is not required to obtain the mass flow rate, and therefore this hydrant can be produced at a lower cost. This embodiment also employs a dual-use check valve. The check valve is closed by a spring when the hydrant is turned on as shown in FIG. 14 to prevent water from filling the reservoir. Again, when water is flowing through the double check backflow preventer a suction can still be produced to pull water from the reservoir through this check valve. When the hydrant is turned off, a screen piston 68 moves up when it contacts the bottom surface 59 of the reservoir which forces the check valve 34 into the open position as shown in FIG. 15. This allows the water in the hydrant to drain into the reservoir, thereby making the hydrant freeze resistant. Other embodiments of the present invention employ a venturi to evacuate a reservoir, but do not need a diverter to operate correctly. More specifically, a venturi is provided that will evacuate a reservoir through a double check backflow preventer.

Figure 16:
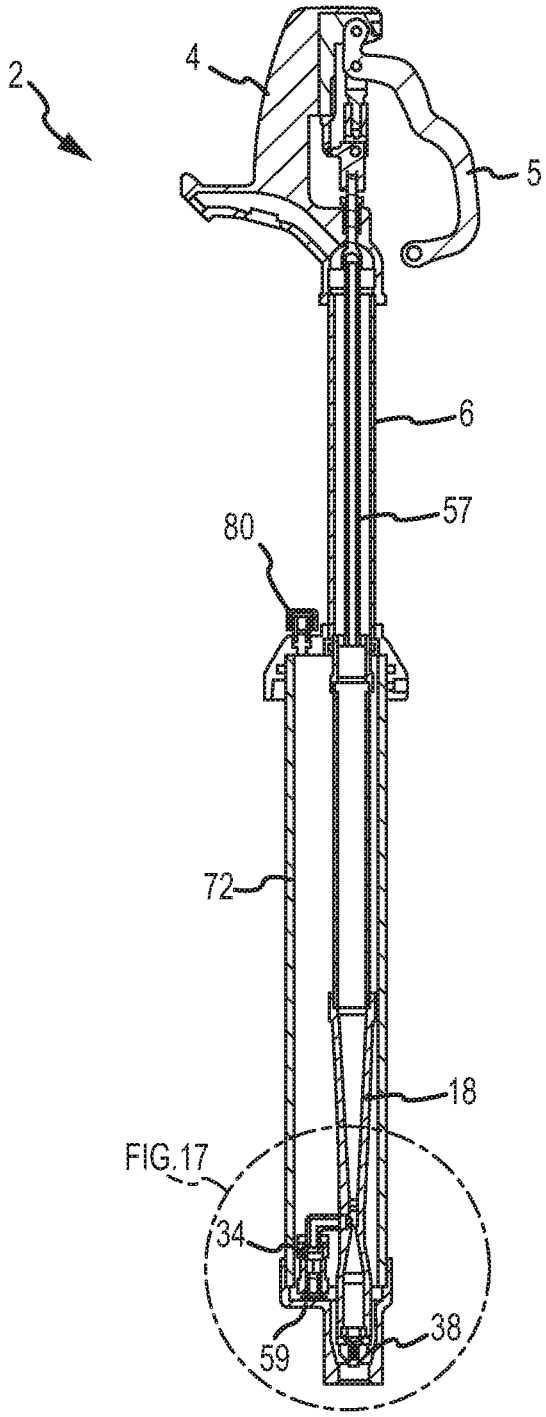
FIG. 16 is a cross sectional view showing a hydrant of another embodiment of the present invention.
Figure 17:
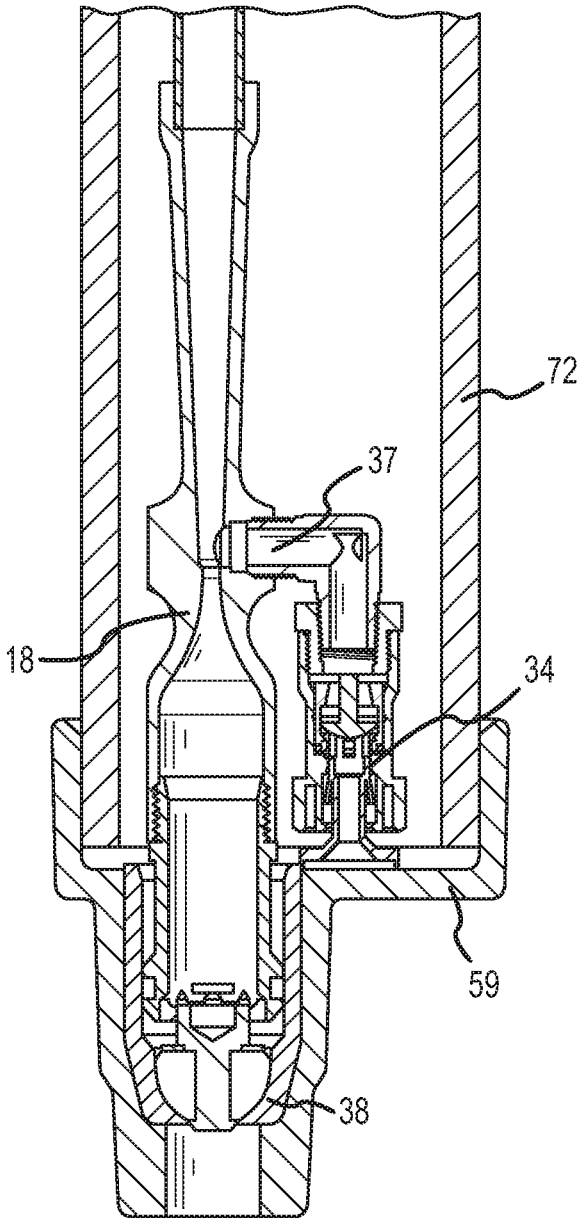
FIG. 17 is a detail view of FIG. 16.
Figure 18:
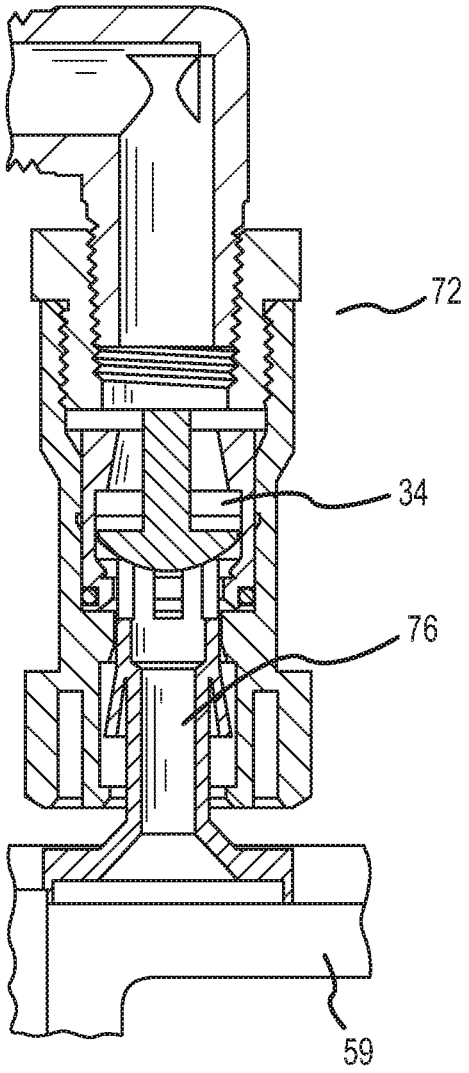
FIG. 18 is a detail view of FIG. 17

FIGS. 16-18 show a hydrant of another embodiment of the present invention that is simpler and more user friendly than sanitary hydrants currently in use. This hydrant is limited to a 5' bury depth and a minimum working pressure of about 40 psi, which maximizes the venturi flow rate potential, while still being able to evacuate the reservoir as water flows through a double check. A one-way check valve 34 is provided that is forced open when the hydrant is shut off as shown in FIG. 17.

In operation, this venturi system operates similar to those described above with respect to FIGS. 5-11. More specifically, the venturi is interconnected to a movable control rod 57 that is located within the standpipe 6. The handle 5 of the hydrant is thus ultimately interconnected to the venturi 18 and by way of the control rod 57. To turn on the hydrant, the user moves the handle 5 to an open position, which pulls the control rod 57 upwardly and opens the inlet valve 38 such that water can enter the venturi 18. Pulling the venturi upward also removes the check valve 34 upwardly such that the screen piston 68 moves away from the bottom surface 59 of the hydrant 2. To turn the hydrant off, the handle 5 is moved to a closed position which moves the control rod 57 downwardly to move the venturi 18 downwardly to close the inlet valve 38. Moving the venturi downwardly also transitions the screen piston 68 which opens the check valve 34. To allow for evacuation reservoir a vent 80 may be provided on an upper surface of the hydrant.

Generally, this hydrant functions when a hose is attached to the backflow preventer. When the hose is attached, the venturi will not operate correctly and the pressure acting on the one way check valve 34 will prevent water ingress into the reservoir 72. After the hydrant is shut off, the hose is removed from vacuum breaker, the hydrant must be turned on so that the water can flow through the double check vacuum preventer for about 15 seconds. That is, when there is no hose attached, the venturi will create a vacuum sufficient enough to suction water from the reservoir 72, and making the hydrant frost proof. When the hydrant is later shut off, the check valve piston 26 will move up and force the one way check valve to an open position which allows the water in the hydrant to drain into the reservoir 72.

Figure 19:
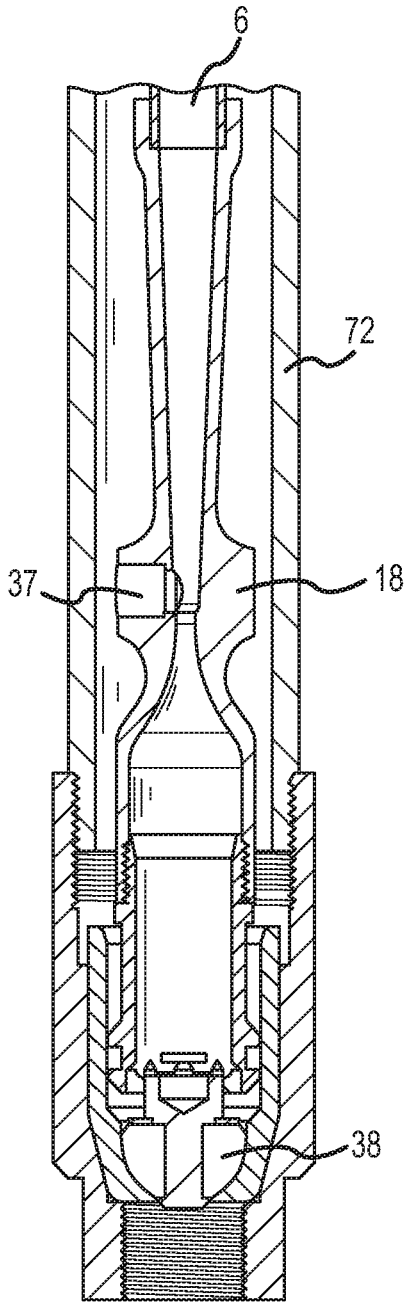
FIG. 19 is a cross section of another embodiment of the present invention.

FIG. 19 shows yet another hydrant of embodiments of the present invention that is designed specifically for mild climate use (under 2' bury) and roof hydrants. The outer pipe of the roof hydrant is a smaller 1½ diameter PVC, instead of the 3" used in some of the embodiments described above. This hydrant uses a venturi without a check valve in concert with a pressurized reservoir, a diverter is not used. The operation is the same as described above with respect to hydrant with a pressurized reservoir, with the evacuation of the reservoir being completed after the user detaches the hose.

FIG. 20 is a table comparing the embodiments of the present invention, which employ an improved venturi of that employ a bypass system, with hydrants of the prior art manufactured by the Assignee of the instant application. The embodiment shown in FIG. 7, for example, provides an increased flow rate, has an increased bury depth, and can operate at lower fluid inlet pressures. The evacuation time is discussed over the prior art.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein is capable of other embodiments and of being practiced or of being carried out in various ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. For example, aspects of inventions disclosed in U.S. Pat. Nos. 5,632,303, 5,590,679, 7,100,637, 5,813,428, and 20060196561, all of which are incorporated herein by this reference, which generally concern backflow prevention, may be incorporated into embodiments of the present invention. Aspects of inventions disclosed in U.S. Pat. Nos. 5,701,925 and 5,246,028, all of which are incorporated herein by this reference, which generally concern sanitary hydrants, may be incorporated into embodiments of the present invention. Aspects of inventions disclosed in U.S. Pat. Nos. 6,532,986, 6,805,154, 6,135,359, 6,769,446, 6,830,063, RE39235, 6,206,039, 6,883,534, 6,857,442 and 6,142,172, all of which are incorporated herein by this reference, which generally concern freeze-proof hydrants, may be incorporated into embodiments of the present invention. Aspects of inventions disclosed in U.S. Patent and Published Patent Application Nos. D521113, D470915, 7,234,732, 7,059,937, 6,679,473, 6,431,204, 7,111,875, D482431, 6,631,623, 6,948,518, 6,948,509, 20070044840, 20070044838, 20070039649, 20060254647 and 20060108804, all of which are incorporated herein by this reference, which generally concern general hydrant technology, may be incorporated into embodiments of the present invention.

What is claimed is:

1. A sanitary hydrant, comprising:

a pipe having a first end and a second end;

a head interconnected to the first end of the pipe;

a fluid reservoir associated with the second end of the pipe a venturi positioned within the reservoir and interconnected to the second end of the pipe, the venturi comprised of a first end, which is interconnected to the pipe, and a second end associated with a fluid inlet valve with a throat between the first end and the second end of the venturi;

a bypass tube having a first end interconnected to a location adjacent to the first end of the venturi and a second end interconnected to a bypass valve, the bypass valve also associated with the second end of the venturi;

wherein when the bypass valve is opened, fluid flows from the inlet valve, through the bypass tube, through the pipe, and out the head; and wherein when the bypass valve is closed, fluid flows through the venturi.

2. The hydrant of claim 1, further comprising a check valve associated with the venturi that selectively allows access to the internal volume of the reservoir.

3. The hydrant of claim 1, wherein further comprising a freeze recognition button that allows the user to ascertain if the water has been evacuated from the pipe after flow of fluid from the hydrant is ceased.

4. The hydrant of claim 3, wherein the freeze recognition button is associated with a visual indicator.

5. The hydrant of claim 1, wherein a double check valve is associated with the head of the hydrant.

6. The hydrant of claim 5, wherein the double check valve is comprised of: a valve body with threads that are adapted to receive a hose, the valve body also having an inlet volume and an outlet volume separated by an internally-disposed wall, a lower surface of the wall defining a valve seat, the valve body further including a vent that provides a flow path between the outside of the valve body and the inlet volume;

a seal positioned within the valve body in a volume located adjacent to the inlet volume, the seal adapted to selectively block the vent;

a valve cap interconnected to the valve body that is positioned within the volume that maintains the seal against the valve body, the valve cap having threads for interconnection to a fluid outlet of the head;

an inlet check valve comprising: an inlet check spring positioned within the inlet volume, wherein the spring contacts an upper surface of the wall, an inlet check body positioned within the inlet check spring, an inlet check seal interconnected to the inlet check body that is adapted to selectively engage the seal, thereby opening and closing an aperture of the seal to control fluid flow from the valve cap into the inlet volume;

a drain spring positioned within the outlet volume that contacts the seat and a plunger that is adapted to engage a hose;

an outlet check valve comprising: an outlet check body positioned within the drain spring, an outlet check seal interconnected to the outlet check body that is adapted to selectively engage the seat to either open a flow path between the inlet volume and outlet volume, or isolate the outlet volume from the inlet volume, thereby preventing fluid from flowing from an interconnected hose into the fluid outlet of the head; and an outlet check spring positioned about the outlet check body that contacts a portion of the outlet check body and a hub of the plunger.

7. A method of evacuating a sanitary hydrant, comprising:

providing a pipe having a first end and a second end;

providing a head for delivering fluid interconnected to the first end of the pipe;

providing a fluid reservoir associated with the second end of the pipe;

providing a venturi positioned within the reservoir and interconnected to the second end of the pipe, the venturi comprised of a first end, which is interconnected to the pipe, and a second end associated with a fluid inlet valve with a throat between the first end and the second end of the venturi;

providing a bypass tube having a first end interconnected to a location adjacent to the first end of the venturi and a second end interconnected to a bypass valve, the bypass valve also associated with the second end of the venturi, wherein when the bypass valve is opened, fluid flows from the inlet valve, through the bypass tube, through the pipe, and out the head; and wherein when the bypass valve is closed, fluid flows through the venturi;

initiating fluid flow through the head by actuating a handle associated therewith;

actuating a bypass button that opens the bypass valve such that fluid is precluded from entering the venturi;

actuating the bypass button to close the bypass valve;

flowing fluid through the venturi;

evacuating the reservoir;

ceasing fluid flow through the hydrant; and draining fluid into the reservoir.

8. The method of claim 7, further comprising interconnecting a hose to the head with a backflow preventer therebetween.

9. The method of claim 7, further comprising a check valve associated with the venturi that selectively allows access to the internal volume of the reservoir.

10. The method of claim 7, further comprising actuating a freeze recognition button; and ascertaining if the water has been evacuated from the pipe after flow of fluid from the hydrant is ceased.

* * * * *